US012350900B2

(12) United States Patent
Weibel et al.

(10) Patent No.: US 12,350,900 B2
(45) Date of Patent: Jul. 8, 2025

(54) COMPACT IN-LINE HEAT PRESS

(71) Applicant: ColDesi, Inc., Tampa, FL (US)

(72) Inventors: Brett Weibel, Seminole, FL (US); Mark Mombourquette, Treasure Island, FL (US)

(73) Assignee: ColDesi, Inc., Tampa, FL (US)

( * ) Notice: Subject to any disclaimer, the term of this patent is extended or adjusted under 35 U.S.C. 154(b) by 379 days.

(21) Appl. No.: 17/792,261

(22) PCT Filed: Jan. 15, 2021

(86) PCT No.: PCT/US2021/013663
§ 371 (c)(1),
(2) Date: Jul. 12, 2022

(87) PCT Pub. No.: WO2021/146575
PCT Pub. Date: Jul. 22, 2021

(65) Prior Publication Data

US 2023/0051762 A1 Feb. 16, 2023

Related U.S. Application Data

(60) Provisional application No. 62/962,450, filed on Jan. 17, 2020.

(51) Int. Cl.
*B30B 1/12* (2006.01)
*B30B 1/04* (2006.01)
(Continued)

(52) U.S. Cl.
CPC .................. *B30B 1/12* (2013.01); *B30B 1/04* (2013.01); *B30B 15/007* (2013.01);
(Continued)

(58) Field of Classification Search
CPC ........... B30B 1/04; B30B 1/12; B30B 15/007; B30B 15/064; B30B 15/14; B30B 15/285; D06F 71/026; D06F 71/08; B41F 16/0046
See application file for complete search history.

(56) References Cited

U.S. PATENT DOCUMENTS 5,769,999 A * 6/1998 Anderson ......... B29C 66/91421
100/319
6,058,834 A 5/2000 Beckwith
(Continued)

FOREIGN PATENT DOCUMENTS

WO 8907045 A1 8/1989

*Primary Examiner* — Jimmy T Nguyen
(74) *Attorney, Agent, or Firm* — Dorton & Willis, LLP

(57) ABSTRACT

A compact, portable in-line heat press machine that holds the upper heated platen horizontal and laterally aligned with the lower platen is provided. The lower frame has front and rear pivot joints on each side of such frame to accommodate linkage arms pivotally attached to it and the upper frames which has similar pivot joints. As such the upper heated platen is lifted up and straight back with respect to the lower platen assembly which completely clears the lower platen for unobstructed loading/unloading of lower platen while keeping the upper platen assembly in a horizontal position. When the upper platen is moved into the lower position, a locking mechanism affixes the upper and lower platen assemblies so that the platen actuators can cause a linear movement between them thus causing a pressing action.

17 Claims, 14 Drawing Sheets

(51) Int. Cl.

| | |
|---|---|
| ***B30B 15/00*** | (2006.01) |
| ***B30B 15/06*** | (2006.01) |
| ***B30B 15/14*** | (2006.01) |
| ***B30B 15/28*** | (2006.01) |
| ***B41F 16/00*** | (2006.01) |
| ***D06F 71/02*** | (2006.01) |
| ***D06F 71/08*** | (2006.01) |
| ***D06F 71/12*** | (2006.01) |

(52) U.S. Cl.
CPC ............ *B30B 15/064* (2013.01); *B30B 15/14* (2013.01); *B30B 15/285* (2013.01); *B41F 16/0046* (2013.01); *D06F 71/026* (2013.01); *D06F 71/08* (2013.01)

(56) References Cited

U.S. PATENT DOCUMENTS

| | | | | |
|---|---|---|---|---|
| 7,185,584 | B1 * | 3/2007 | Woods | D06B 11/0076 100/320 |
| 7,448,241 | B2 * | 11/2008 | Davies | B30B 15/285 72/14.3 |
| 2010/0206180 | A1 | 8/2010 | Ricchio et al. | |
| 2014/0238600 | A1 * | 8/2014 | Mahn | B44C 1/1712 156/309.9 |
| 2018/0093439 | A1 | 4/2018 | Galkin | |

* cited by examiner

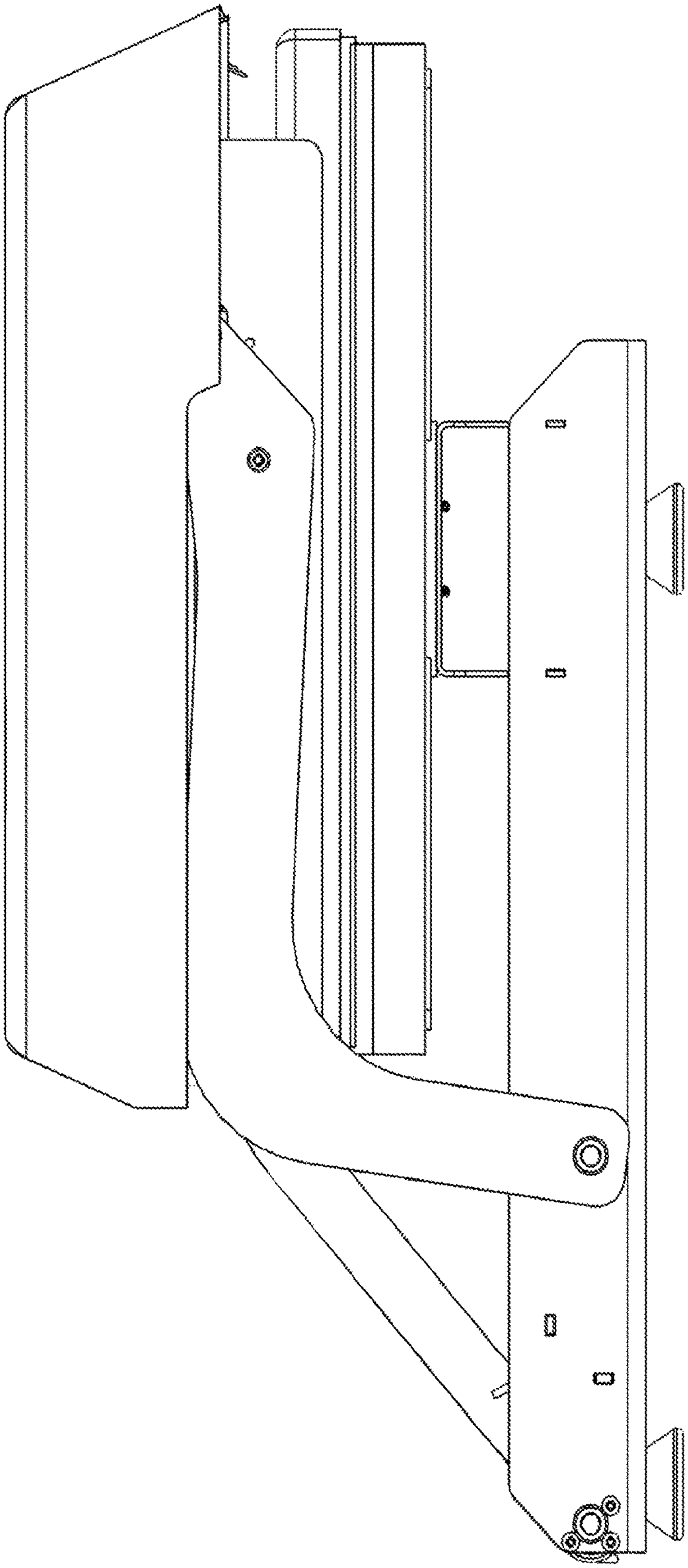
Fig. 2b

COMPACT IN-LINE HEAT PRESS

CROSS-REFERENCE TO RELATED APPLICATIONS

This application is a national phase application under 35 U.S.C. § 371 of International Patent Application No. PCT/US2021/013663, filed Jan. 15, 2021, which claims the benefit of priority to U.S. Provisional Patent Application No. 62/962,450, filed Jan. 17, 2020, the disclosures of which are incorporated by reference herein in their entirety.

TECHNICAL FIELD

The present invention relates generally to material processing machines and, more particularly, to heat press machines.

BACKGROUND

Heat presses have been used in industry for many decades. Decorators have used these heat presses for many purposes: for ironing a substrate, transferring indicia onto a substrate, drying coatings applied to a substrate, sublimating color onto a substrate, curing ink applied to a substrate, etc. Over the years engineers and designers have developed many varieties of two fundamental heat press movements: the clam-shell movement, and the swing-away movement. (See, for example, U.S. Patent Application Publication No. 2008/0196836 to Woods at paragraph 0006; U.S. Pat. No. 8,418,739 to Robinson at second paragraph of the Background: "Conventional heat transfer press machines are of two general types. The two types include a clam-shell type and a swing away type.") Each of these two movement technologies have inherent drawbacks in their design and function.

For example, the clam-shell design has an upper and lower structural frame each attached to a pivoting mechanism. The pivoting mechanism has a horizontal hinge point some distance to the rear of both platens. This pivoting mechanism allows the upper platen mechanism to lift angularly about the pivot hinge point and away from the lower platen surface. This angular lift movement behind both platen mechanisms is how the clam-shell design is named; movement similar to an actual clam-shell. These clam-shell heat presses are more compact, have smaller footprint, lighter weight and generally less expensive than the swing-away heat press. The main disadvantages of the clam-shell heat press design are uneven heat distribution of the upper platen, excessive heat loss to the surrounding area, a partially-obstructed work area, uneven contact points with the lower platen, and poor ergonomic design due to the angular movement of the upper platen.

In the open position of the clam-shell press, the upper platen is generally held at about a 45-degree angle to about a 70-degree angle over the top of the lower platen surface, this being the main design feature of the clam-shell heat press. This design feature partially obstructs the lower platen surface making it difficult to lay product on the lower platen or to use the lower platen as a work surface without getting burned. While the heat press is open, the heat radiates out toward the operator and the surrounding environment, making this heat press design uncomfortable to work with and inefficient with respect to energy usage. Also, as the control system and mechanic assembly holds the upper platen in the open position while product is not being pressed, the upper part (front edge) of the heated platen will become warmer than the lower part as heat rises due to the angled nature of movement. As engineers increase the angle of the upper platen to allow for more clearance for the lower platen, the effects of environmental heating and uneven heat distribution are increased. On the other hand, as the angular limit of the upper platen is decreased to reduce heat loss and uneven heat distribution, the work area of the lower platen becomes obstructed. These two scenarios are contradictory to each other, thus there is no optimum design for the clam-shell style heat press. Engineers end up creating clam-shell designs which partially obstruct the work area while partially conserving heat energy.

In addition to the aforementioned drawbacks, the clam-shell heat press design has poor ergonomics and a non-linear point of contact between the upper and lower platens caused by the angular movement. As the upper platen is rotated downward toward the lower platen, the rear edge of the upper and lower platens meet before the front edges since the horizontal hinge point is located behind the rear edge of both platens. Designers have made advances in linkage implementation as well as making a floating upper platen attachment, but as the machines wear during longevity of use, the rear edges tend to touch first. This uneven contact timing can cause problems and uneven decorating of some sensitive transfer substrates. Also, most of the clam-shell heat presses available on the market have a spring force which will open the press and keep it in the open position until ready to be used. These heat presses have handles and arms which protrude above and forward of the front edge of the upper platen. Since the upper platen is on an angular motion upward, the handle point where an operator must pull to lower the upper platen becomes quite high. This high operating height combined with the need for users to overcome the substantial spring force results in poor ergonomics on almost all clam-shell heat press designs. Such poor ergonomics can increase shoulder and upper back strain for operators who use these machines frequently.

Another issue with the clam-shell design is their auto release mechanism. Once the press cycle has timed out an electromagnet which holds the upper platen in the closed position releases its hold allowing the upper platen assembly to spring open to original position. While this auto release system has been implemented to keep from burning substrates, and generally frees the operator from constantly monitoring the press, its implementation can lead to issues in decorating apparel. As the electromagnet releases its hold there is a sudden and violent pop actions which can, in some cases, damage the decorated garment. This is especially noticeable in instances where a very high pressing force is required.

The second type of heat press design currently available is the swing-away heat press. This design incorporates a substantial vertical pivot post which is incorporated in the machine base frame and is located some distance behind the upper and lower platen assemblies. The upper platen assembly is incorporated with a structural pivot assembly that is concentric to the vertical pivot post in the machine base frame. This pivot assembly allows the upper platen assembly to pivot horizontally in either direction away from vertical registration with the lower platen, thus allowing unobstructed clearance for accessing the lower platen. Once a substrate has been placed on the lower platen and is ready for pressing, the upper platen can be rotated horizontally so that it is in vertical alignment with the lower platen and a mechanical linkage or an actuator produces linear vertical movement in order to lower the upper platen down onto the lower platen to thereby impart force on the substrate. Additionally, there have been swing-away design improvements which incorporate dual movements where, in addition to the horizontal rotary motion described above, the lower platen is mounted on linear rails so it can be moved straight forward to expose it for loading/unloading substrate while the upper platen remains stationary in its laterally aligned state.

The major drawbacks of the standard swing-away heat press and the dual movement swing-away heat press are: a larger footprint (and much larger in the case of the dual movement swing-away press), an unstable assembly which could tip over as the upper platen is rotated to the side, heavier weight construction, use of outriggers on some designs, generally more expensive, and on units without an actuator to produce vertical pressing there is no automatic disengagement of the heated platen of the substrate (i.e. the operator must monitor and lift the heated platen manually).

The upper platen on all heat presses includes a solid cast aluminum plate with heating coils incorporated into the casting. This, along with the covers and framing, make the upper platen assembly quite heavy. Thus, as the swing-away upper platen assembly is rotated off of its front vertical axis, the overhung load of the upper platen assembly can make the machine tip over. This scenario is quite dangerous, as the upper platen is usually heated to between 300 to 380 degrees Fahrenheit. Heat press designers need to make the base assembly quite substantial in order to support this swinging off-center load which makes the heat press very heavy. In the case of the dual action swing-away press the unit weight is even higher requiring at least two people to move the machine. In some cases, bars need to be attached to the base at a 90-degree angle to the lower platen which act as an anti-tip mechanism. In addition to the heavy weight of this style heat press there needs to be clearance for the upper platen to rotate a minimum of 100 degrees about its vertical axis. This makes for a much larger usable footprint. Therefore swing-away presses utilize a large amount of space in any print shop. In the case of the dual movement swing-away design the total machine footprint is even larger than the standard swing away heat press. When operating this press using the sliding lower platen assembly, the operator must step backward as they pull the platen out and then step forward when the platen is pushed in. Thus there is a lot of extra movement required by the operator when using the press in this fashion. Due to the additional weight, size and style of movement of the swing-away heat press they tend to be more expensive that a clam-shell heat press with the same heated area. Additionally, the dual movement swing-away heat press is quite a bit more expensive than the standard swing away heat press.

To date there has not been an improved version of the fundamental movement technologies of the clam-shell and swing-away heat press designs. Accordingly, a need exists for an improved heat press that will allow clear, unobstructed access to the lower platen surface, even and consistent heating of the upper platen regardless of open time, a smaller working footprint, a simple ergonomic design to eliminate shoulder and back strain, and automated systems to save energy and avoid injury.

SUMMARY

The embodiments in accordance with the present disclosure provide a new version of a heat press machine with fully automatic and safe operation as well as a superior mechanical movement. A mechanical assembly lifts the upper platen upwardly and rearwardly while keeping the upper platen in a horizontal orientation and laterally aligned with the lower platen. This is accomplished using two lever arms on each side of the upper and lower platen frames and attached to these frames through round pivot pins that create a parallel motion mechanism. One of the main functions of the improved heat press is the mechanical movement up and straight back while keeping the upper platen horizontal and parallel with respect to the lower platen. In doing so the heat press is able to overcome the drawbacks of conventional heat press designs discussed above. By keeping the upper platen horizontal and parallel to the lower platen throughout its entire movement, and by moving the upper platen straight up and back with respect to the lower platen, the lower platen will be completely exposed to be used as an unobstructed work surface. This arrangement also keeps the upper and lower platens completely parallel and horizontal so that even heating and even pressing movements are always maintained.

In accordance with one embodiment, the heat press is a fully automatic machine with sensors that facilitate controlled movement and ensure safe operation. An exemplary heat press in accordance with the principles of the present disclosure includes two main axes of movement that create the process cycle: a primary movement axis and a force movement axis. The primary movement moves the upper platen assembly from its fully open position to its closed position and vice-versa. During the close cycle, operator settings in the machine control system can dictate whether the upper platen stops in intimate contact and in a locked position with the substrate on the lower platen, just in contact with the subject substrate, or hovering some specified distance above subject substrate. This primary movement mechanism has one or more actuator assemblies attached to the mechanical assembly to drive the upper platen assembly through its motion. There are various sensors, as described below, which the machine control system uses to determine the precise location of the upper platen assembly with respect to the lower platen, the thickness of the substrate supported on the lower platen, parallelism of the upper platen with respect to the lower platen, amount of force applied by the upper platen onto the substrate and the location of the operator's hands in order to keep the movement and clamping operations safe. These actuator(s) and sensors are aspects of the fully automatic function of the heat press.

One aspect of the primary movement is to move the upper platen onto the subject substrate and clamp the upper platen assembly onto the substrate using linkage assemblies located within the upper platen mechanism. Once the upper assembly is locked onto the substrate, if desired, the second axis of movement can initiate actuator(s) which will cause the upper heated platen to be forced vertically down onto the substrate with a substantial and controlled force thus pressing the substrate to a specified force. This force movement axis uses one or more actuators to push the upper platen vertically down onto the lower platen once the upper platen has been locked in place. Some operations may require a specified higher force of pressing to obtain the proper end result. The machine operator can enter the desired pressing force for the specific decorating circumstance or select from a list of preset pressing scenarios and the machine control system will press the substrate to the specified force. Once the cycle timer has been satisfied, the force actuators quickly retract the force from the upper platen so that the primary movement actuators can unlock the upper assembly and lift the upper platen assembly to its fully open state.

A third, but minor, axis of movement is a leveling actuation. In one exemplary embodiment, the force actuators are attached at two points to the upper platen. It is intended that the upper platen will always be horizontal and parallel to the lower platen, but since the upper platen is attached by two points (in this embodiment) there may be scenarios where rocking of the upper platen may occur. This rocking action may, at times, put the upper platen out of parallelism with the lower platen. Thus, a third actuator could be implemented between the upper platen framework and the upper platen itself which would control the orientation of the upper platen in such a way to always keep it level with the lower platen. Since there are sensors located on the upper platen which measure level and location of the upper platen, the machine control system can use information from these sensors to control the leveling axis accordingly.

In order to safely lower and clamp the heated platen, an exemplary embodiment uses a number of sensors which monitor presence of foreign objects (including humans) and motion interruption sensors. The presence detection sensor(s) use one or more sensors to monitor the pressing area (the area inside the perimeter of the upper and lower platens). If a foreign object is within the pressing area, the primary movement closing operation will not be initiated until clear. Also, if the presence sensors detect a foreign object entering the pressing area once the close cycle has been initiated, the machine control system will halt the closing movement and open the upper platen to a safe distance until the foreign object is removed. Additionally, there are motion sensors which monitor any disturbance to the primary movement and will halt and reverse the close movement if a primary movement disturbance has been detected before the upper platen has reached its target location.

The following example embodiments identify various aspects of a heat press and a method of heat pressing in accordance with the principles of the present disclosure.

Example Embodiment 1. A heat press comprising an upper heated platen and a lower platen supported for movement relative to one another between an open position wherein the upper platen is spaced apart from the lower platen, and a closed position wherein the upper platen is positioned in close proximity to the lower platen, the heat press configured such that when moved from the closed position to the open position, the upper heated platen is moved away from the lower platen such that no part of the upper platen is vertically above the lower platen at any height and does not have any vertical pivot axis in its movement.

Example Embodiment 2. The heat press of Example Embodiment 1, that has movement such that the upper platen and lower platens are always kept horizontal and parallel to each other throughout the entire machine movement, and wherein the upper platen remains laterally aligned with the lower platen during the movement.

Example Embodiment 3. The heat press of any preceding Example Embodiment, further comprising a locking mechanism that fixes the upper and lower platen assemblies in close proximity and aligned on all vertical planes to each other, and maintains such position and alignment regardless of forces applied.

Example Embodiment 4. The heat press of Example Embodiment 3, further comprising a device which will create linear movement between the upper and lower platen assemblies once the locking mechanism is engaged, forcing the upper and lower platens together and thereby creating an even pressing action across the face of each platen.

Example Embodiment 5. The heat press of Example Embodiment 3 or 4, wherein the locking mechanism automatically adjusts to a locked state regardless of the thickness of a substrate supported on the lower platen.

Example Embodiment 6. The heat press of any preceding Example Embodiment, further comprising a linear actuating system configured to control force between the upper and lower platens independently on each of the four corners of the platens.

Example Embodiment 7. The heat press of any preceding Example Embodiment, further comprising an automatic perimeter sensor configured to detect the presence of a person or object within the pressing area and cooperates with the machine control to prohibit pressing action until the pressing area is clear.

Example Embodiment 8. The heat press of any preceding Example Embodiment, wherein the heat press is configured for automatic closing when not in use to thereby contain heat and reduce energy consumption.

Example Embodiment 9. The heat press of any preceding Example Embodiment, further comprising sensors configured to detect interference of the moving upper and/or lower platens before the heat press reaches the closed position.

Example Embodiment 10. The heat press of any preceding Example Embodiment, further comprising one or more sensors configured to determine parallelism between the upper and lower platens, and a machine control system configured to actuate the heat press to correct and adjust a detected non-parallelism.

Example Embodiment 11. The heat press of any preceding Example Embodiment, wherein at least one of the upper or lower platens has continuously adjustable and programmable height positions, wherein at least one of the upper or lower platens can be held at a preset height position automatically.

Example Embodiment 12. The heat press of any preceding Example Embodiment, further comprising force actuators with current feedback to control and limit total overall pressing force.

Example Embodiment 13. The heat press of any preceding Example Embodiment, wherein the lower platen is supported on a frame of the heat press and is configured for movement relative to the frame in at least one of a fore-aft direction or a vertical direction.

Example Embodiment 14. A method of heat pressing a substrate, comprising:

moving an upper platen from a closed position in close proximity to a lower platen, to an open position spaced apart from the lower platen while maintaining the upper platen in a horizontal orientation;

wherein moving the upper platen comprises moving the upper platen in directions vertically upward and backward relative to the lower platen while maintaining lateral alignment of the upper platen with the lower platen.

Example Embodiment 15. The method of Example Embodiment 14, further comprising:

placing a substrate on the lower platen; and moving the upper platen relative to the lower platen from the open position to the closed position;

wherein moving the upper platen relative to the lower platen comprises moving the upper platen in directions vertically downward and forward relative to the lower platen while maintaining lateral alignment of the upper platen with the lower platen.

Example Embodiment 16. The method of Example Embodiment 14 or 15, further comprising automatically moving the upper platen relative to the lower platen from the open position to the closed position when the heat press is not being used for heat pressing a substrate.

Example Embodiment 17. The method of any one of Example Embodiments 14 to 16, further comprising:

detecting the presence of an undesired object within the pressing area with at least one sensor; and prohibiting movement of the upper platen relative to the lower platen from the open position to the closed position in response to a detected presence of an undesired object.

Example Embodiment 18. The method of any one of Example Embodiments 14 to 17, further comprising:

locking the upper platen and the lower platen in the closed position.

Example Embodiment 19. A heat press as shown and described herein.

Example Embodiment 20. A method of heat pressing a substrate as described herein.

While various embodiments of a fully automatic machine are shown and described, it will be appreciated that semi-automatic and/or manual movement and operation could be implemented without departing from the scope and spirit of the invention.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this Specification, illustrate exemplary embodiments of the invention and, together with a general description of the invention given above, and the detailed description given below, serve to explain the principles of the invention.

FIG. 2B is a side view of the machine of FIG. 1, with the upper heated platen assembly in a fully closed position.

DETAILED DESCRIPTION

Figure 1:
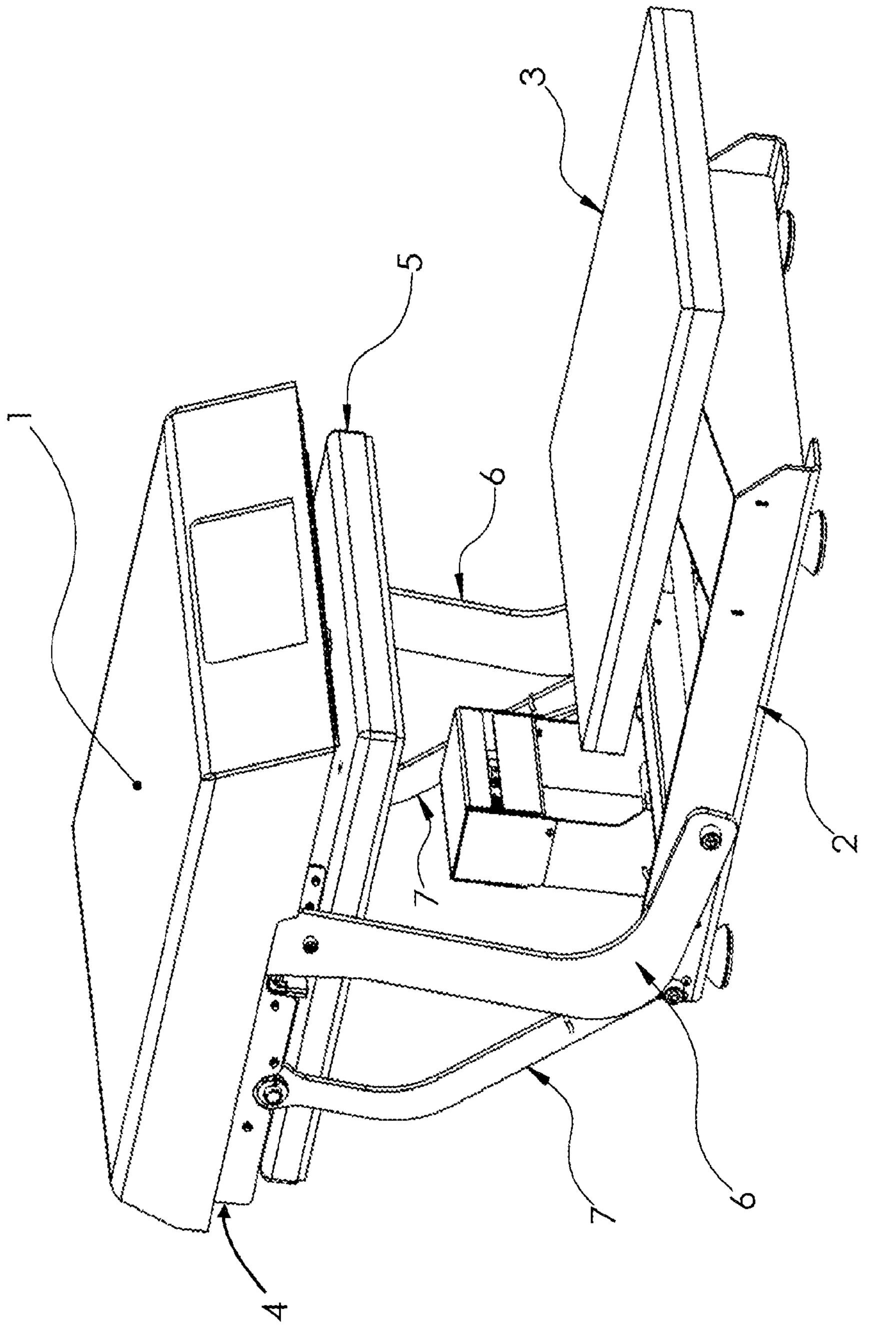
FIG. 1 is a perspective view of an exemplary machine for heat pressing substrates in accordance with the principles of the present disclosure.

FIG. 1 depicts an exemplary machine 1 for heat pressing substrates in accordance with the principles of the present disclosure. The machine 1 includes a lower platen support frame 2, a lower platen 3 which can be easily interchanged for different size platens, an upper heated platen assembly 4 which contains the heated platen 5, front primary lift arms 6 and rear primary lift arms 7 as the major components.

Figure 2A:
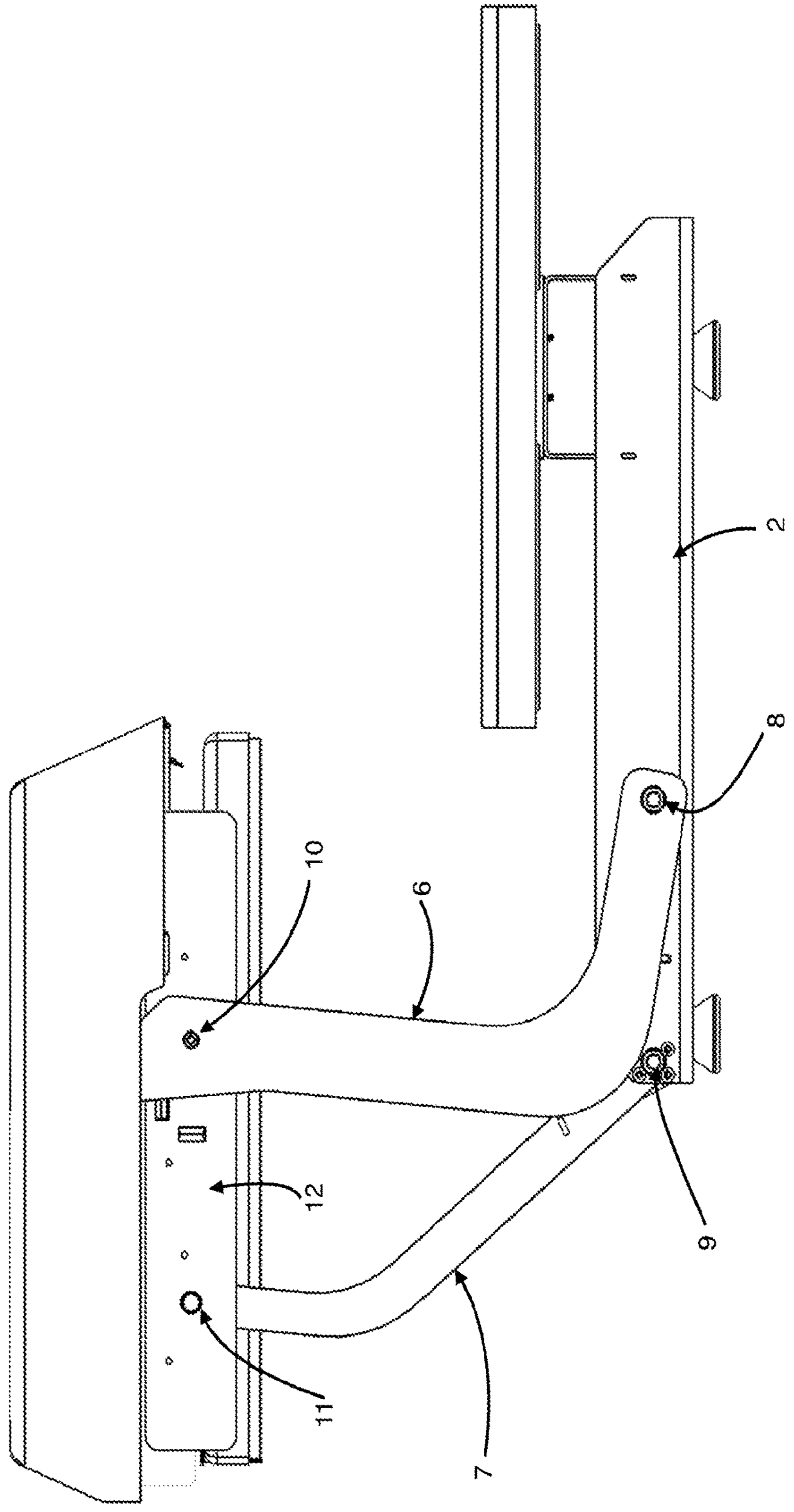
FIG. 2A is a side view of the machine of FIG. 1, with the upper heated platen assembly in a fully open position.

FIG. 2A is a side view of the machine 1 in the fully open position. The front primary lift arms 6 and rear primary lift arms 7 are each attached to the lower platen support frame 2 through the use of front lower pivot joints 8 and rear lower pivot joints 9. This allows each arm to freely pivot around each pivot joint causing the arms to rotate in a circular manner. The front primary lift arms 6 have holes at either end which align with the front lower pivot joint 8; the same hole pattern is also on the rear primary lift arms 7. The opposite end of each front and rear primary lift arms has pivot holes which align with front upper pivot joints 10 and rear upper pivot joints 11 that are within the upper heated platen side frame 12. The straight distance between the upper and lower pivot holes in the front primary lift arms 6 and rear primary lift arms 7 are substantially the same values (i.e., within typical manufacturing tolerances) such that the lower platen support frame 2, upper heated platen side frame 12, front primary lift arm 6 and rear primary lift arm 7 form a four bar parallel motion mechanism that acts through the four pivot points. The lower platen support frame 2 and upper heated platen assembly 4 have substantially the same four bar parallel motion mechanism on each side of the machine 1 which lifts the upper heated platen assembly 4 substantially upwardly and rearwardly with respect to the lower platen 3, while keeping the upper heated platen assembly 4 perfectly horizontal and parallel with the lower platen 3.

FIG. 2B is a side view of the machine 1 in its fully closed position.

Figure 3A:
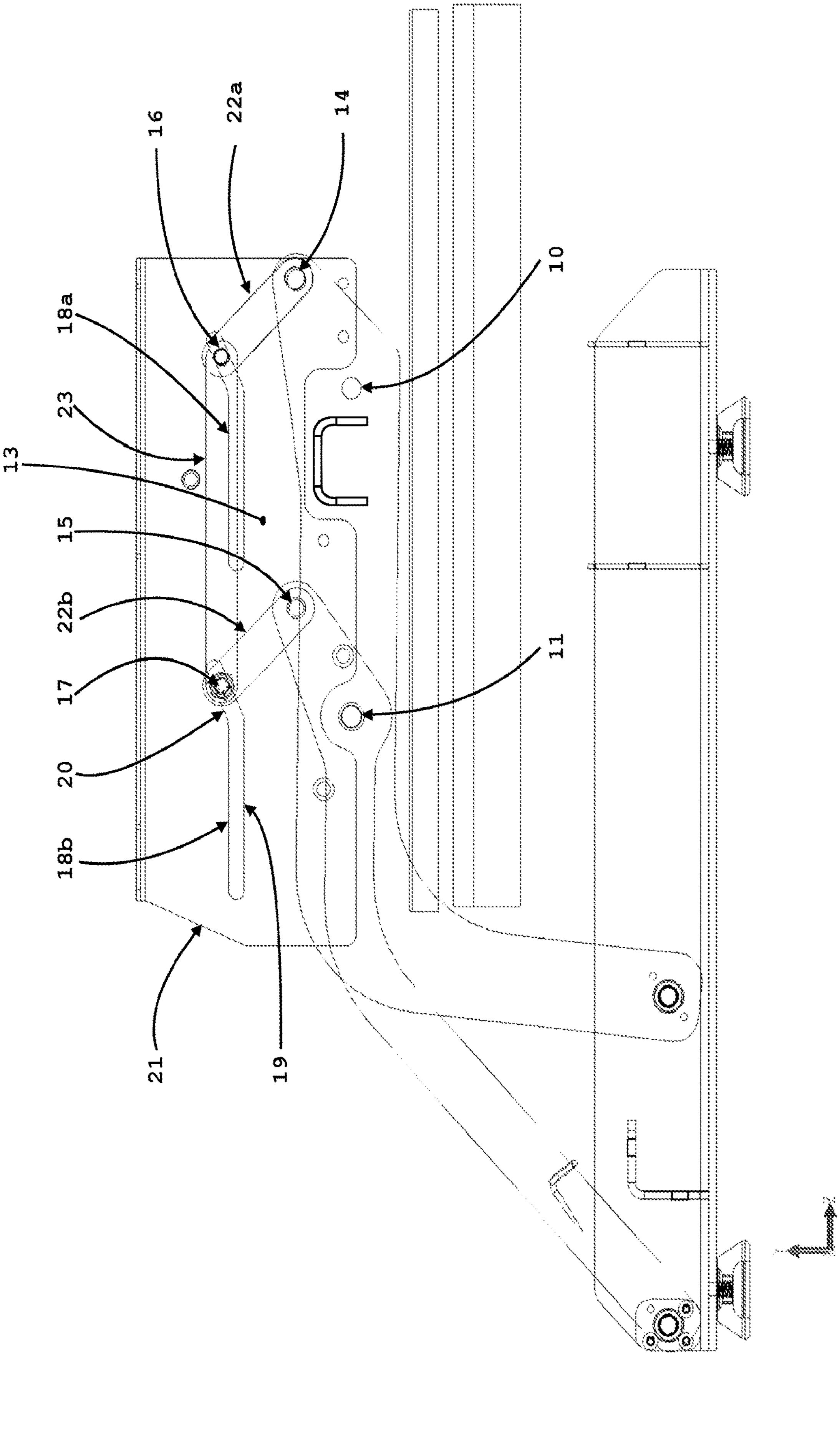
FIG. 3A is a section view illustrating the locking mechanism during pressing of a thin substrate.

FIG. 3A is a section view showing the locking mechanism 13 which holds or locks the position of the upper heated platen assembly 4 with respect to the lower platen 3. The locking mechanism 13 is a second three bar linkage with four pivot points 14, 15, 16, 17 which it acts about. The entire locking mechanism 13 is guided through two substantially identical guide slots 18_a_ & _b_ which are cut into the lock link guide plates 21. Pivot points 16 & 17 are guide pins which protrude through each of the front guide slot 18_a_ and rear guide slot 18_b_. These guide slots 18_a_, 18_b_ are horizontally spaced at substantially the same distance as the front upper pivot joint 10 and rear upper pivot joint 11. This arrangement allows the locking mechanism to freely travel along the length of the two guide slots 18_a_, 18_b_ without restriction or binding. Pivot joints 16 and pivot joints 17 are tied together through connecting link 23. Each of the front primary lift arms 6 have a third pivot hole some distance past the pivot holes attached to the front upper pivot joint 10. This third pivot hole is connected to the front lock links 22_a_ through pivot joint 14. Each of the rear primary lift arms 7 also have a third pivot hole some distance past the pivot holes attached to the rear upper pivot joint 11. This third pivot hole is also connected to the rear lock links 22_b_ through pivot joint 15. Pivot joint 16 protrudes through guide slot 18*a* which guides the path of pivot joint 16 through the entire movement of the upper heated platen assembly 4. Likewise, pivot joint 17 protrudes through guide slot 18*b* which guides the path of pivot joint 17 through the entire movement of the upper heated platen assembly 4. The combination of front lock links 22*a*, rear lock links 22*b*, connecting link 23, and pivot joints 10, 11, 16, 17 all work in unison to create the locking mechanism 13. There are two components to each guide slot; a horizontal slot 19 and a slot incline 20. Pivot joints 16 & 17 travel along each respective guide slot 18*a*, 18*b*. The position of each guide joint 16 & 17 with respect to the horizontal slot 19 or slot incline 20 portion of each guide slot 18*a*, 18*b* dictate whether the primary movement is in a lock state or travel (unlocked) state. When each of the pivot joints 16 & 17 are traveling along the horizontal slot 19 of each guide slot 18*a*, 18*b*, the upper heated platen assembly is travelling from its open position to its closed position and vice-versa. When pivot points 16 & 17 are travelling up the slot incline 20 portion of each guide slot 18 *a* & *b* the heated platen 5 is substantially vertically above the lower platen 3 and within close proximity to touching the lower platen 3. At any point the pivot joints 16 & 17 are travelling on the slot incline 20, a vertical downward force applied to the heated platen 5 to make contact with the lower platen 3 or a substrate place on the lower platen 3 will cause an equal and opposite force to be placed on pivot joints 16 & 17 to the slot incline 20. This equal and opposite force acting on pivot joints 16 & 17 will cause the locking mechanism 13 to lock the upper heated platen assembly 4 in place and restrict any vertical or horizontal movement. The reason this action occurs is that the equal and opposite force is acting on pivot joints 16 & 17 at a point where the resultant force on slot incline 20 is substantially at right angles to slot incline 20. Thus, the entire locking mechanism restricts any further movement.

Figure 3B:
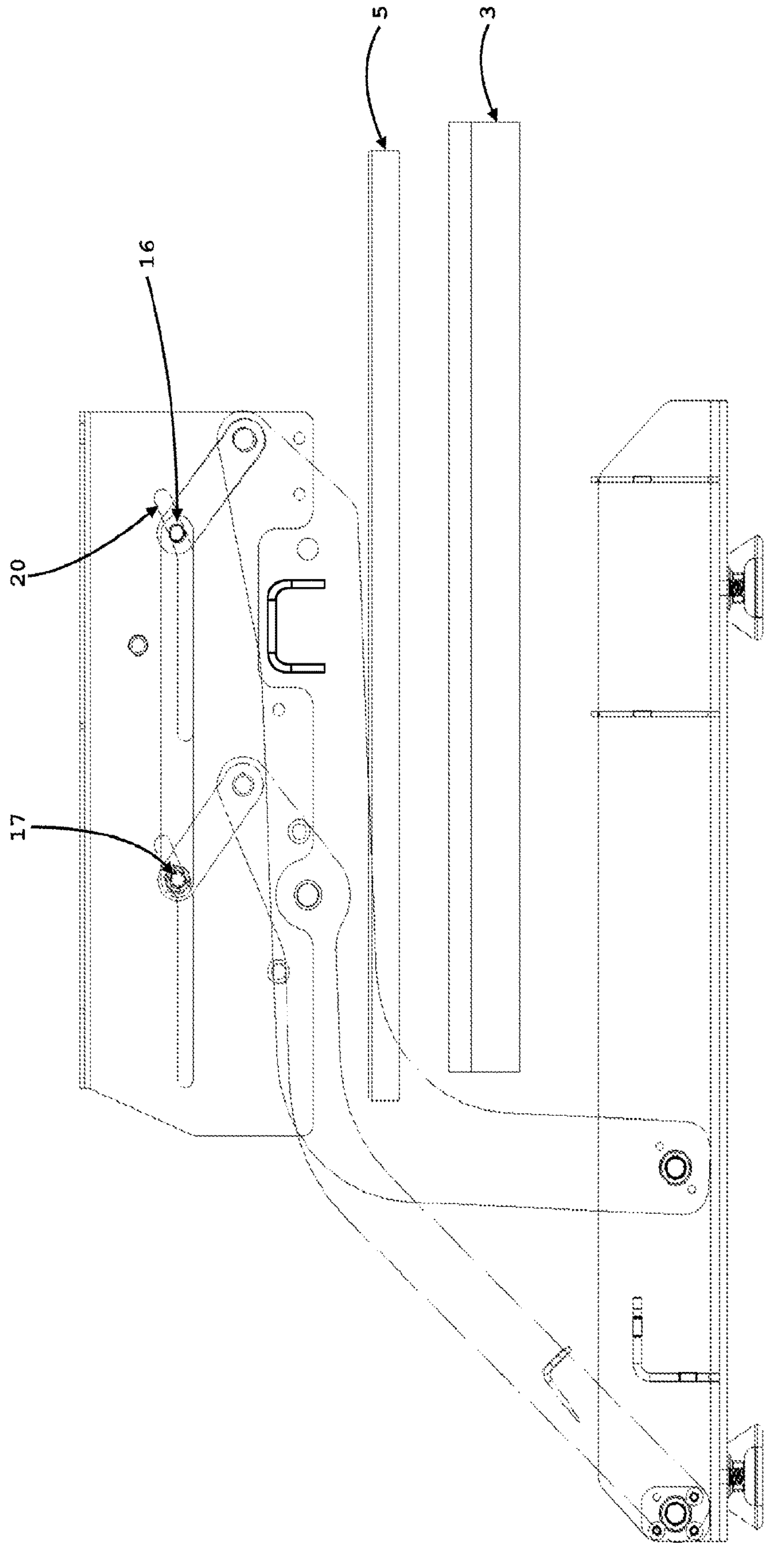
FIG. 3B is a section view illustrating the locking mechanism during pressing of a thick substrate.

FIG. 3B shows the locking mechanism functional and working on thicker substrates as pivot joints 16 & 17 are still substantially perpendicular to slot incline 20 even though they are further down slot incline 20 when compared to their position in FIG. 3A. At any point that the substrate is contacted by the heated platen 5, regardless of substrate thickness, the locking mechanism 13 can hold the upper heated platen assembly 4 stationary so that a pressing action can occur. Thus, the locking mechanism 13 allows for any thickness of substrate to be placed on the lower platen 3 and a clamping action will occur automatically, without any adjustments or settings being made by the machine operator.

Figure 4A:
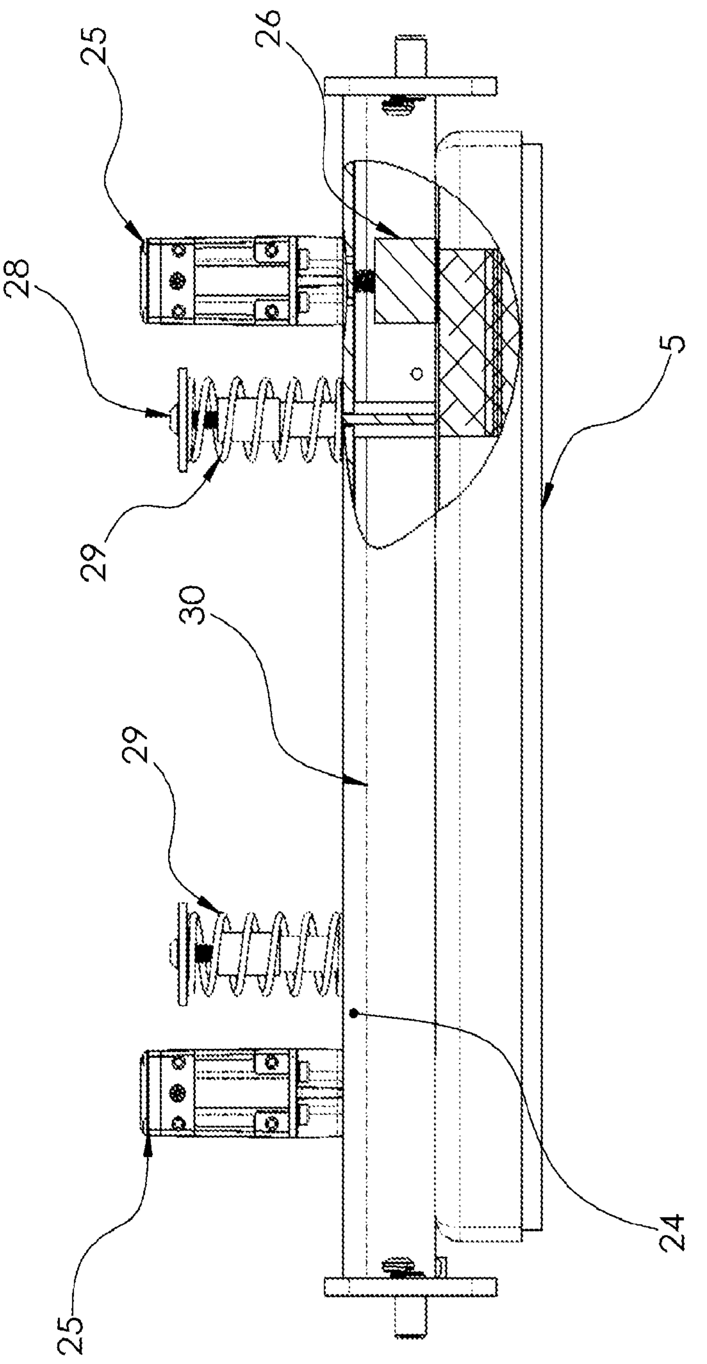
FIG. 4A is a partial detail of the upper platen assembly illustrating a force actuator assembly.

FIG. 4A depicts a detail of the force actuator assembly 24 of the upper platen assembly 4. In the embodiment shown, there are two force actuators 25 which act upon the heated platen 5 to push it vertically down onto the lower platen 3. These force actuators 25 can be electric, pneumatic or hydraulic actuators which create proportional linear force based on the input power supplied. In the preferred design electric actuators similar to Commex Inc. part #CX.LAT7 could be used. These actuators are electrically driven with internal DC motors, integral gearbox and a trapezoidal lead screw as the linear output member. The screw end is attached to a press block 26 which acts as a torque arm to keep the lead screw from rotating and to insulate the lead screw and force actuator from any heat produced by the heated platen 5. The bottom of the press block 26 can be made slightly spherical or have a raised boss from its bottom surface to provide point contact on the top of the heated platen 5. Should one side of the heated platen 5 come in contact with the subject substrate slightly before the other, the point contact will allow the heated platen 5 to adjust its level to accommodate such situation. These force actuators 25 are current controlled devices where the amount of current supplied to them at a given DC voltage will produce a precise and repeatable adjustable force output. Thus, the machine 1 control system can produce the desired output force onto the substrate by controlling the current given to each force actuator 25.

Figure 4B:
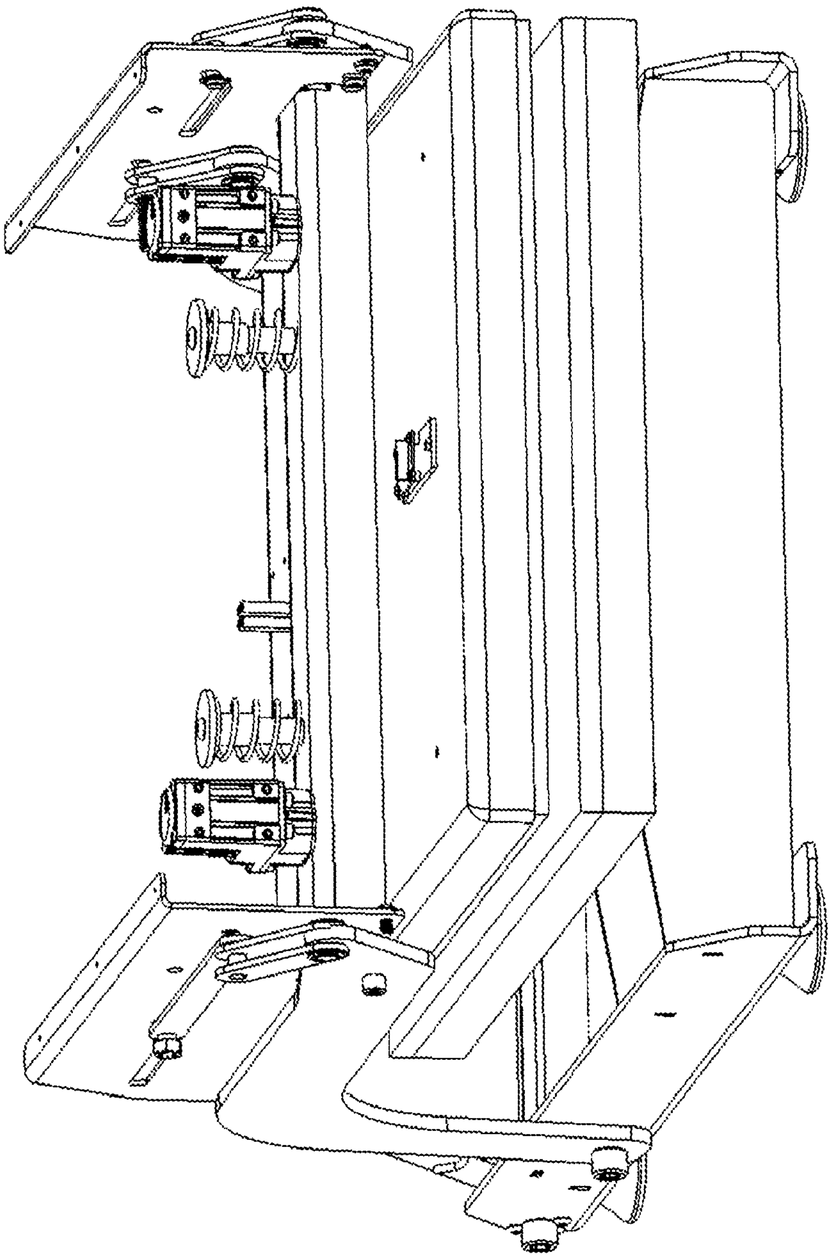
FIG. 4B is a partial detail view similar to FIG. 4A, showing additional structure of the machine.

In FIG. 4B of the exemplary embodiment, the force actuators 25 push on the top of the heated platen 5 and rely on a lift spring system 27 in order to lift the heated platen 5 when the force actuators 25 are retracted at the end of the press cycle. Each lift spring system 27 has a lift screw 28 which is attached to the heated platen 5 and retains the top of the lift spring 29. The lift spring system 27 and force actuators 25 are all mounted on the force actuator bracket 30 which is a structural member of the upper heated platen assembly 4. Alternatively, the force actuators 25 could be mechanically attached to the heated platen 5, which would push on and pull on the heated platen 5 and negate the need for a lift spring system 27. As the force actuators 25 forcefully push down onto the substrate supported by the lower platen 3, the resultant forces are transmitted through the upper heated platen assembly 4 frame to the pivot joints 14 & 15, through the front lock link 22*a* and rear lock links 22*b*, through the pivot joints 16 & 17 onto the slot incline 20 of the lock link guide plates 21 where the resultant force is then transmitted through the pivot points 10 & 11 through the front primary lift arm 6 and rear primary lift arm 7 to the front lower pivot joint 8 and rear lower pivot joint 9 which are integral to the lower platen support frame 2 that supports the lower platen 3. Thus, the forces in the machine 1 are in equilibrium and the press functions as expected.

In another embodiment, force actuators could alternatively be located within the lower platen support frame 2 and directly below the lower platen 3 so as to push vertically upward on the lower platen 3. In this configuration, the lower platen would have a linear guide system which would allow it to move freely in a vertical path. Once the upper heated platen assembly 4 has been lowered to the preferred pressing position and has been locked in place by the locking mechanism 13, the lower force actuators can lift the lower platen 3 with substrate for pressing.

Figure 5A:
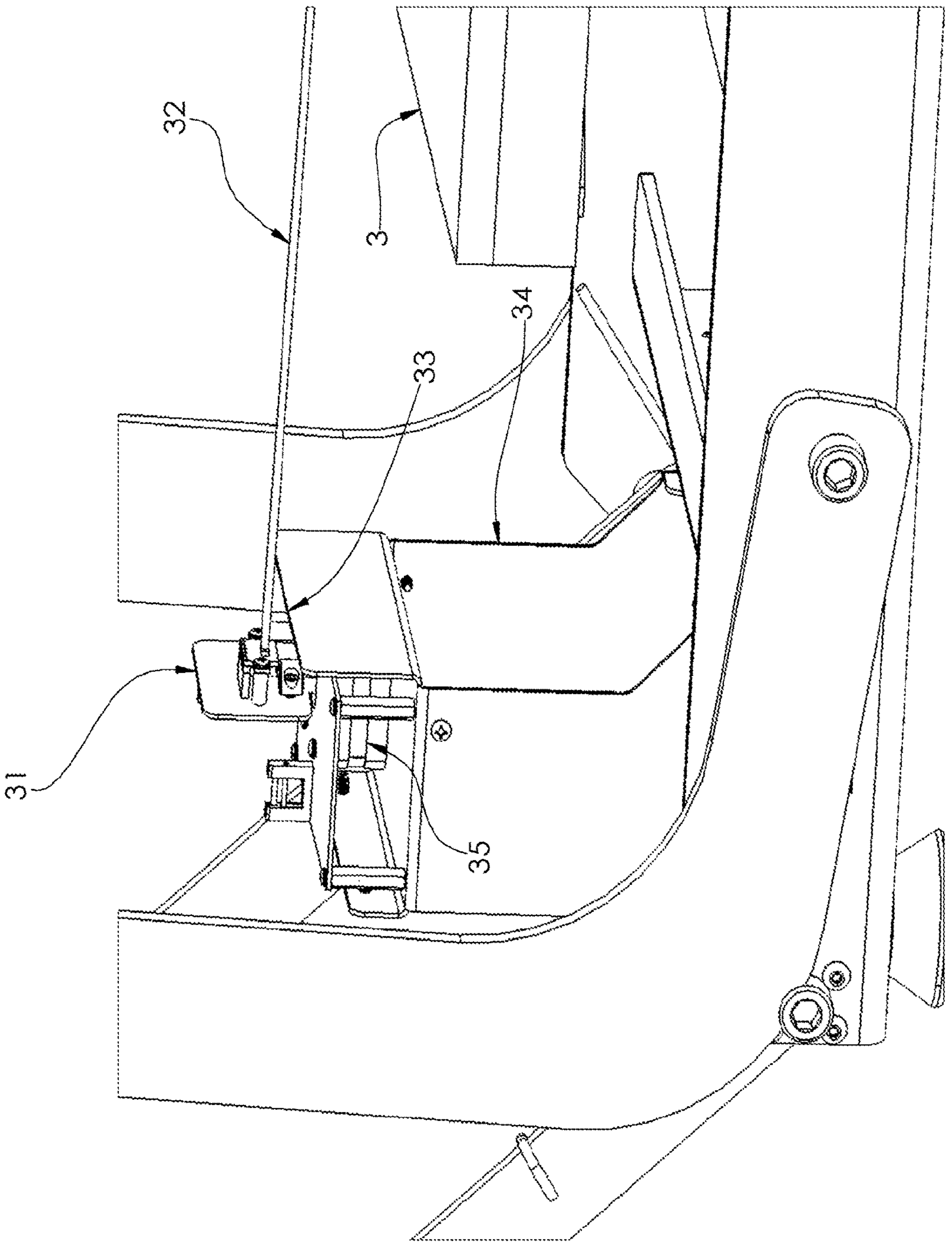
FIG. 5A is an enlarged perspective view of the machine of FIG. 1, illustrating a perimeter obstruction scanner system.

FIG. 5A shows a perspective view of a perimeter obstruction scanner system 31 and its placement behind the rear edge of the lower platen 3. This system uses one or more non-contact distance sensors to sense the area just over the lower platen 3 and subject substrate at all times that the heated platen 5 is not in contact with a substrate. The invisible pulsed beam 32 is emitted from the perimeter obstruction scanner system 31 through a scanning slot 33 in the front of the scanner housing 34. The system uses a scanning motor 35 to continuously rotate the sensor so as to make the invisible pulsed beam 32 traverse the complete area under the heated platen 5. This invisible pulsed beam 32 scanned just above the substrate on the lower platen 3 so that it can detect any foreign object or person's hand before the heated platen 5 makes contact with the subject substrate. If there is any object in the path of the invisible pulsed beam 32, the invisible pulsed beam 32 will be reflected back to the perimeter obstruction scanner system 31 and detected by the system. The machine control system will use the information received from the perimeter obstruction scanner system 31 to determine what course of action to take to keep any person from harm. Another use of the perimeter obstruction scanner system 31 is to detect the presence or absence of any substrate in the machine. Thus, the machine 1 can determine if there is a substrate to be pressed and if the already pressed substrate has been removed from the machine or not. This will help the operator from mistakenly pressing the same substrate twice.

Figure 5B:
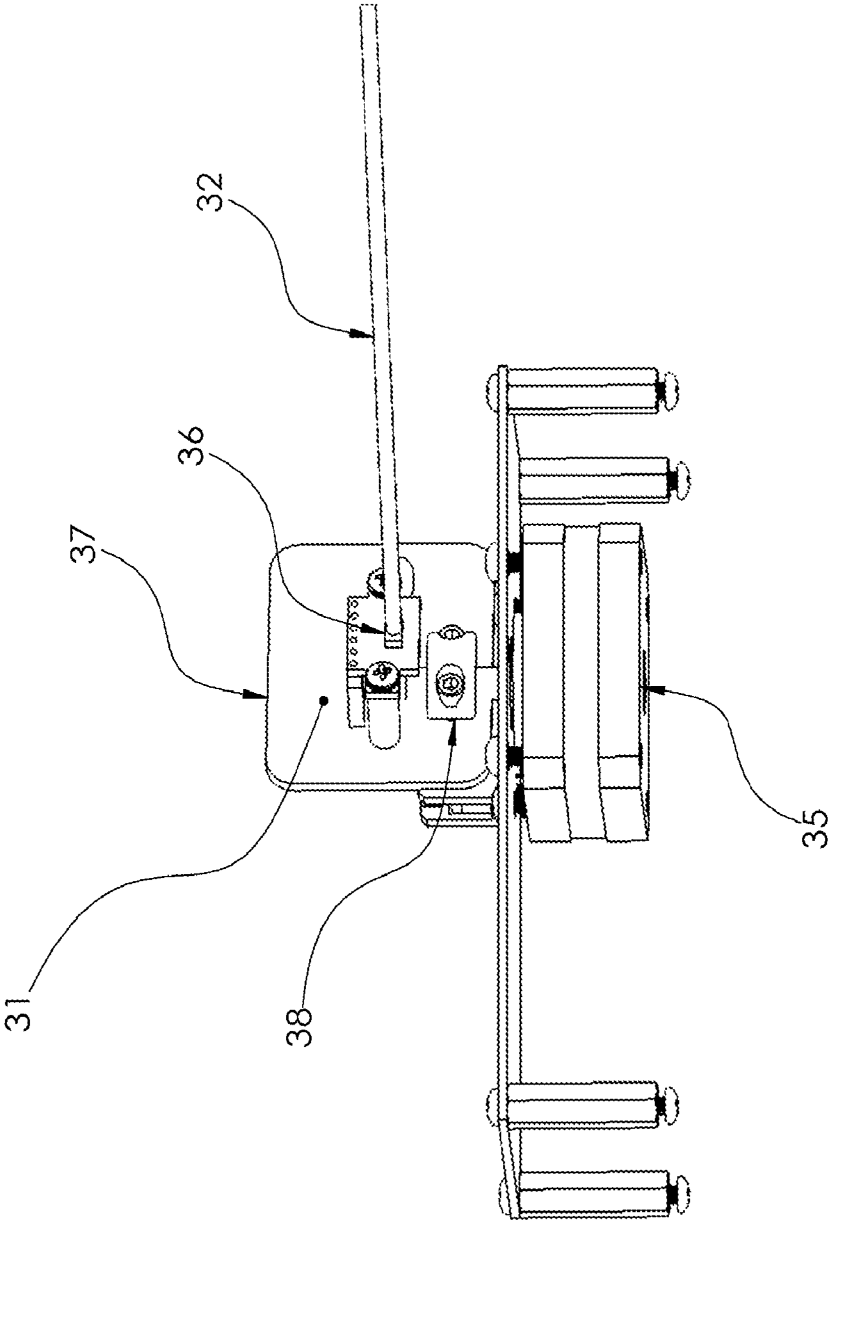
FIG. 5B is an enlarged detail view of the perimeter obstruction scanner assembly of FIG. 5A.

FIG. 5B depicts a subassembly of the perimeter obstruction scanner system 31. This system uses a perimeter sensing module 36 which is a Time-of-Flight type of sensor similar to Pololu Corp's #2490 VL53L0X Time-of-Flight Distance Sensor Carrier. In the embodiment shown, the perimeter sensing module 36 is mounted to a sensor circuit board 37 which is attached to the scanning motor 35 shaft by use of a mechanical clamp 38. The machine control system causes the scanning motor 35 to rotate clockwise then counter-clockwise which causes the invisible pulsed beam 32 to scan the entire area over the lower platen 3 as described above. This type of sensor can detect presence of an object in the invisible pulsed beam 32 path and the distance of such object from the perimeter sensing module 36. Thus, the machine control system can use the feedback from this perimeter sensing module 36 in combination with the known angular rotation of the scanning motor 35 shaft to sense the exact location of foreign objects.

While the perimeter obstruction scanner system 31 has been shown and described herein as being located behind the rear edge of the lower platen 3, it will be appreciated that the perimeter obstruction scanner system 31 may alternatively be located at various other positions suitable for detecting the presence of foreign objects or substrates within the machine. Moreover, while the perimeter obstruction scanner system 31 has been shown and described herein as utilizing invisible pulsed beams to detect objects and substrates, it will be appreciated that various other types of devices suitable for non-contact detection of objects and/or substrates within the machine may alternatively be used. For example, light curtains or other types of detecting devices could be used.

Figure 6:
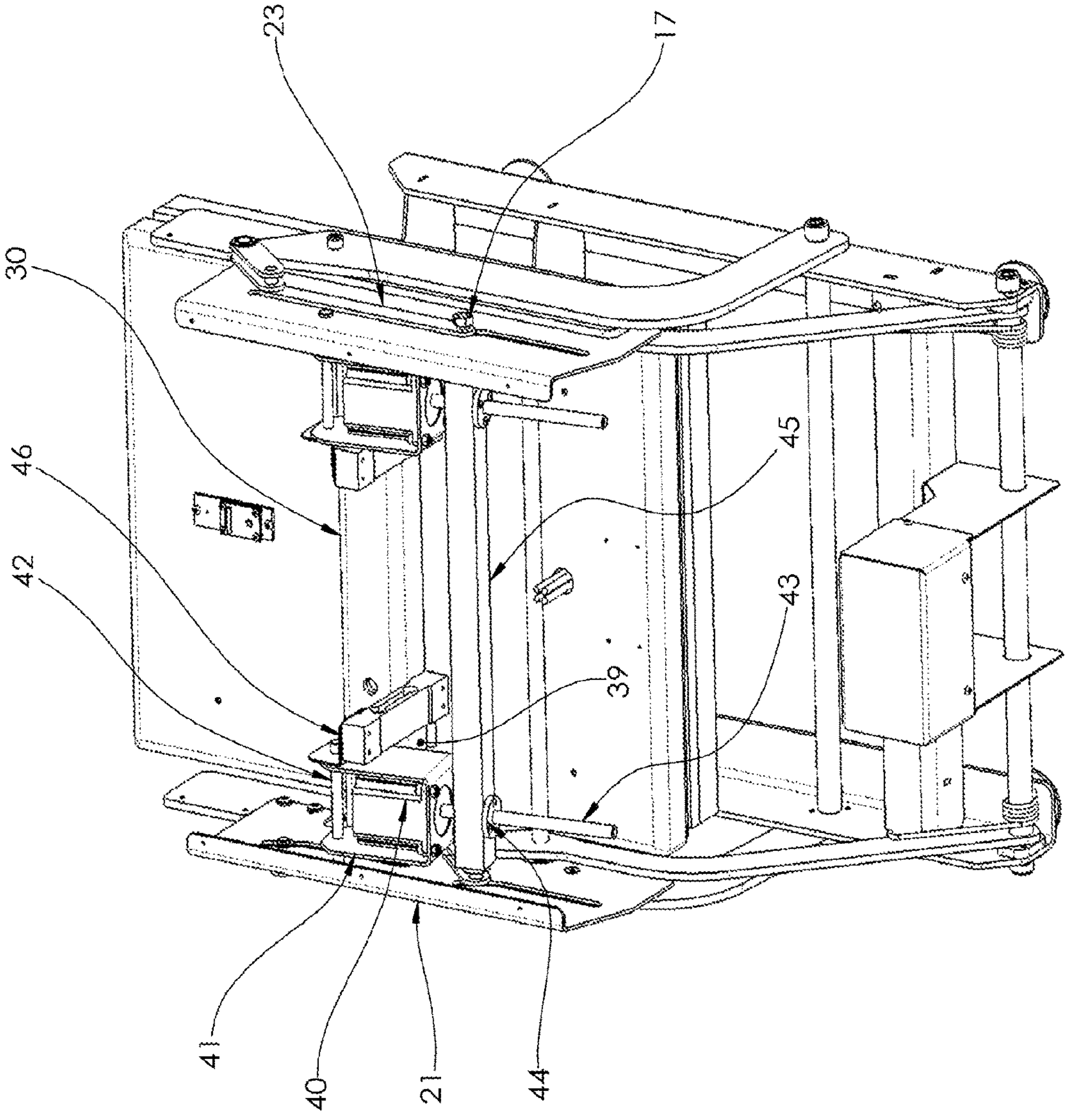
FIG. 6 is a top perspective view of the machine of FIG. 1 with structure removed to illustrate detail of the primary movement assembly.

FIG. 6 is a top rear view of the machine 1 showing the primary movement assembly 39. In the embodiment shown, there are two primary movement linear actuators 40. These can be typical linear actuators similar to those made by HaydonKerk part #E21H4U-2.5-900, which have an integral lead screw as their rotor and an external lead nut to drive the load linearly. The primary movement linear actuator 40 motor is mounted to a primary actuator mounting bracket 41. This primary actuator mounting bracket 41 extends past the back of the motor on the primary movement linear actuator and has a hole through it which acts as a rear mount clevis bracket. There is a primary actuator pivot pin 42 through this hole in the primary actuator mounting bracket 41 that also protrudes through a specified hole in the lock link guide plate 21, thus supporting the outside of the primary actuator pivot pin and allowing the primary movement linear actuator to pivot about this point. On the opposite side of the primary lift linear actuators 40 from the lock link guide plates 21 are mounted primary actuator load cells 46 which can accept the opposite end of the primary actuator pivot pin 42 onto their top section. The bottom section of the primary actuator load cells 46 are rigidly mounted to the force actuator bracket 30. This system will allow the primary movement linear actuator 40 to freely pivot about the primary actuator pivot pin 42 and have the primary actuator load cell 46 measure the direct force being exerted by the primary movement linear actuator 40. The machine control system can use the signal from the two primary actuator load cells 46 to determine if there is an obstruction in the movement of the primary movement and when the heated platen 5 has made contact with the specified substrate.

As discussed herein, each primary movement linear actuator 40 has a primary actuator lead screw 43 which causes liner movement in conjunction with the primary actuator lead screw nut 44. Primary actuator lead screw nuts 44 are mounted into respective ends of the primary actuator guide pin bar 45. Each end of the primary actuator guide pin bar 45 had integral to it pivot joint 17. This pivot joint 17 protrudes through the guide slot 18*b* in each lock link guide plate 21. Thus, as the lead screw 43 of each primary movement linear actuator 40 rotates and causes linear movement with the primary actuator guide pin bar 45, movement is created along the path of each guide slot 18*b*. This movement of pivot joint 17 along guide slot 18*b* is reflected through the locking mechanism 13 through connecting link 23 which causes the upper heated platen assembly 4 to be lifted, lowered, or locked in place.

Figure 7:
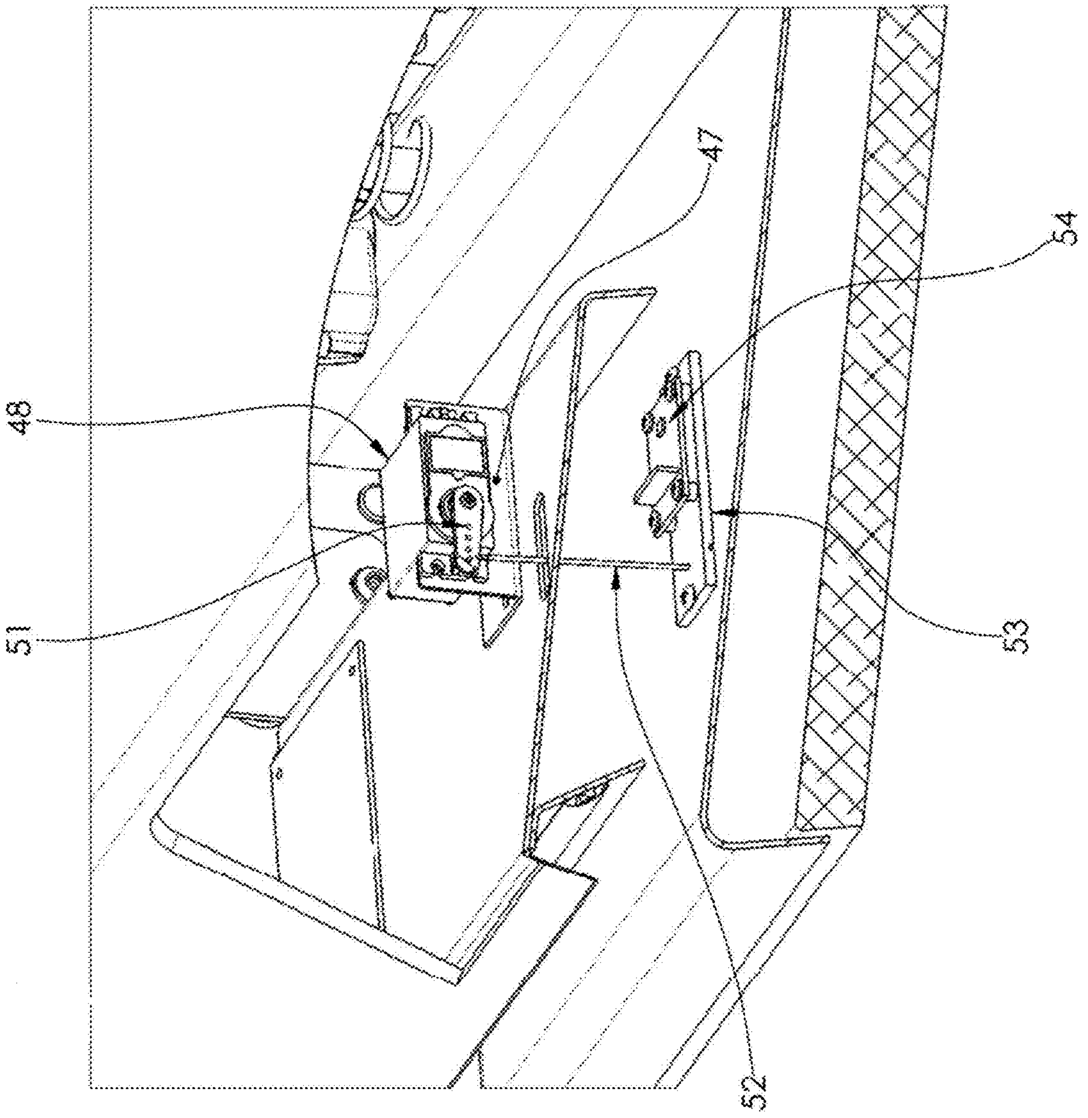
FIG. 7 is a detail of the machine of FIG. 1, illustrating a motion/level sensing and adjusting system.

FIG. 7 is a section view of the upper heated platen assembly 4 detailing the motion/level sensing and adjusting system 47. This system uses a level adjusting motor 48 to adjust the heated platen 5 based on the feedback that the control system receives from the level/motion sensor 54. This sensor is similar to readily available sensor packages from Mouser.com, part #MPU-6050, which has an internal accelerometer and gyroscope circuits to measure six axes of motion. The level/motion sensor 54 is mounted directly to the top cover of the heated platen 5 so that it can monitor position and movement of the heated platen 5. If the machine control system receives a signal from the level/motion sensor 54 that the heated platen 5 is out of level with the lower platen 3, the level adjusting motor 48 can be commanded to rotate the level adjusting motor lever arm 51 which will push or pull on the level adjusting connecting rod 52 which transitionally pushes or pulls on the heated platen 5 due to the anchoring of the level adjusting connecting rod capture plate 53 mounted on the top cover of the heated platen 5. Therefore, this is a closed loop auto leveling system for the heated platen 5.

The level/motion sensor 54 devices are extremely sensitive and accurate so they can give the machine control system highly accurate movement and location feedback. Using this data, the machine control system can determine if the heated platen 5 is out of level, where it is in space throughout the primary movement and if there is any disturbance to the movement of the upper heated platen assembly 4. For example, as the upper heated platen assembly 4 is being lowered by the primary movement assembly 39 toward the lower platen the machine operator may decide to cancel the cycle by bumping the upper heated platen assembly 4 to indicate to the machine control system that an interference has occurred in the primary movement and the machine should open to its original position. Using the level/motion sensor in this fashion creates an incredibly safe and functional heat press.

Figure 8:
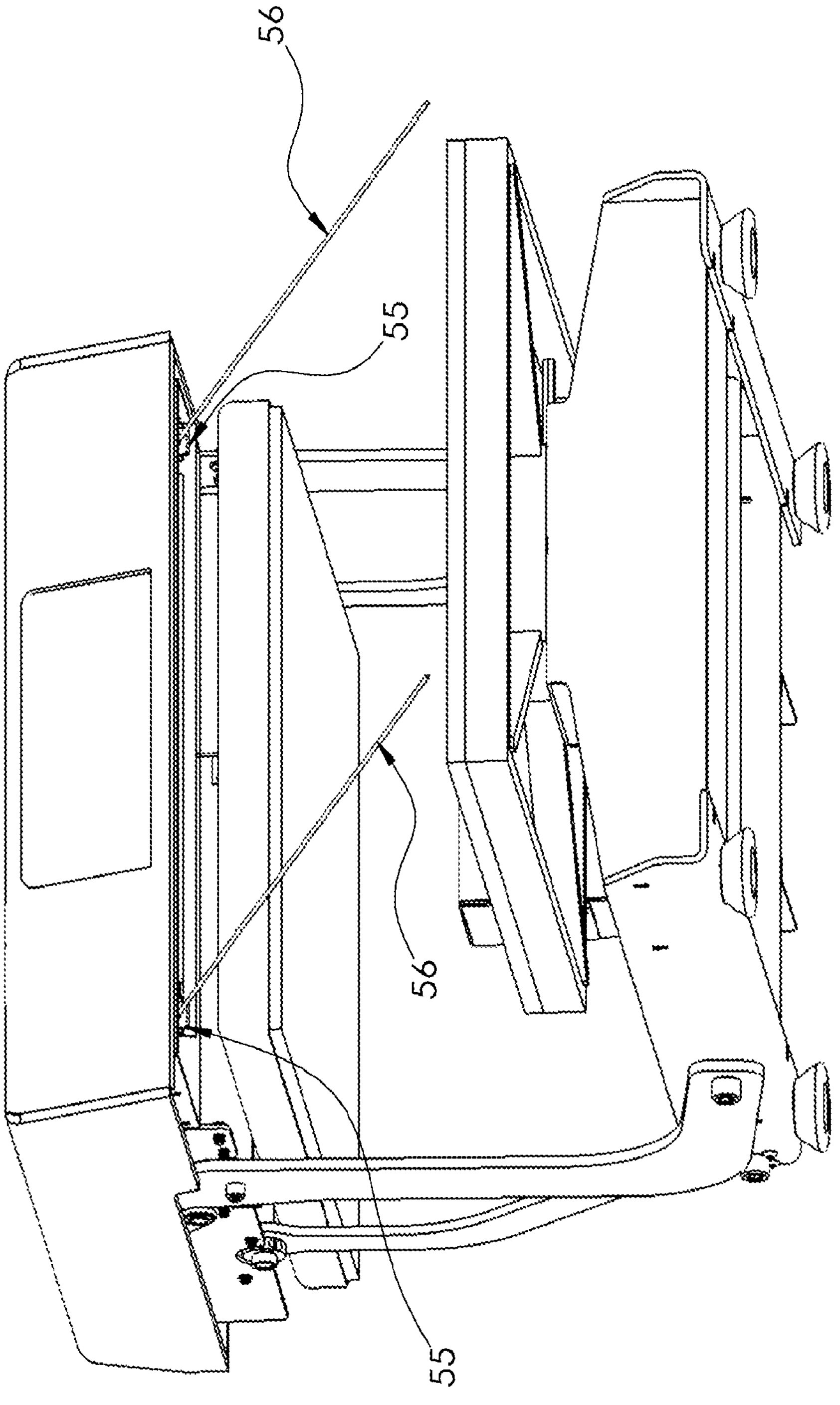
FIG. 8 is a bottom perspective view of the machine of FIG. 1, illustrating non-contact process start sensors.

FIG. 8 shows a mostly frontal and slightly upward view of an embodiment of the exemplary machine 1. Just under the front edge of the upper heated platen assembly 4 cover there may be provided two non-contact process start sensors 55. These can be similar the VL53L0X Time-of-Flight Distance Sensor mentioned above in the perimeter obstruction scanning system 31. Once an operator has loaded the substrate onto the lower platen 3, the operator can use specific hand gestures in front of the machine which will break the invisible sensing beams 56 to initiate various commands. The machine control system can use feedback from the two process start sensors 55 to determine a command the machine operator is wanting to initiate. Thus, the interaction with the heat press machine 1 is extremely ergonomic since there are no push buttons or levers needed to actuate in order to initiate the process.

While FIG. 8 illustrates an exemplary embodiment wherein non-contact sensors are used to facilitate inputting commands for operation of the machine 1, it will be appreciated that various other structures and methods may be provided for inputting commands to the machine 1. As a non-limiting example, an exemplary embodiment of a machine in accordance with the principles of the present disclosure may include one or more sensors provided at suitable locations on the machine 1 and configured to detect actuation by a user to input commands to the machine 1. Such actuation may include, but is not limited to, pressing a button, turning a dial, sensing a touch, and/or detecting an electric current caused by a touch.

IG. 9 depicts another exemplary embodiment of a machine in accordance with the principles of the present disclosure, wherein four force actuators 25 are mounted in each corner of the upper heated platen assembly 4 to accomplish vertical movement of the heated platen 5 with respect to the lower platen 3. In this embodiment, the function of the machine 1 is similar to the description discussed above, except there is no need for the leveling adjusting motor 48 and associated level adjusting motor lever arm 51 and level adjusting connecting rod 52 as the four force actuators can accommodate leveling through the feedback of the level/motion sensor 54. Other operations and functions are similar to those discussed above.

Figure 9:
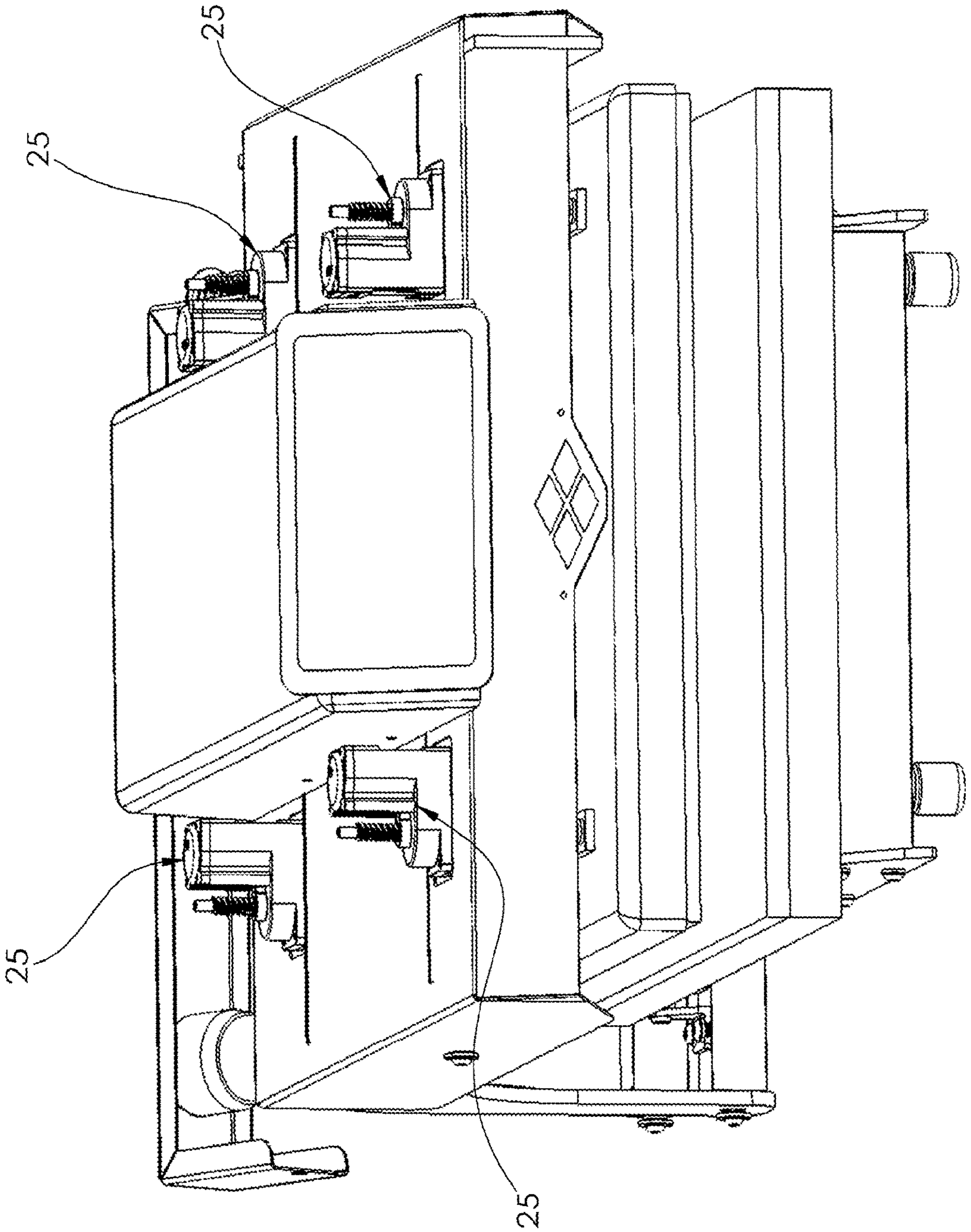
FIG. 9 is a perspective view of another exemplary machine for heat pressing substrates in accordance with the principles of the present disclosure, wherein the machine includes four force actuators.
Figure 10:
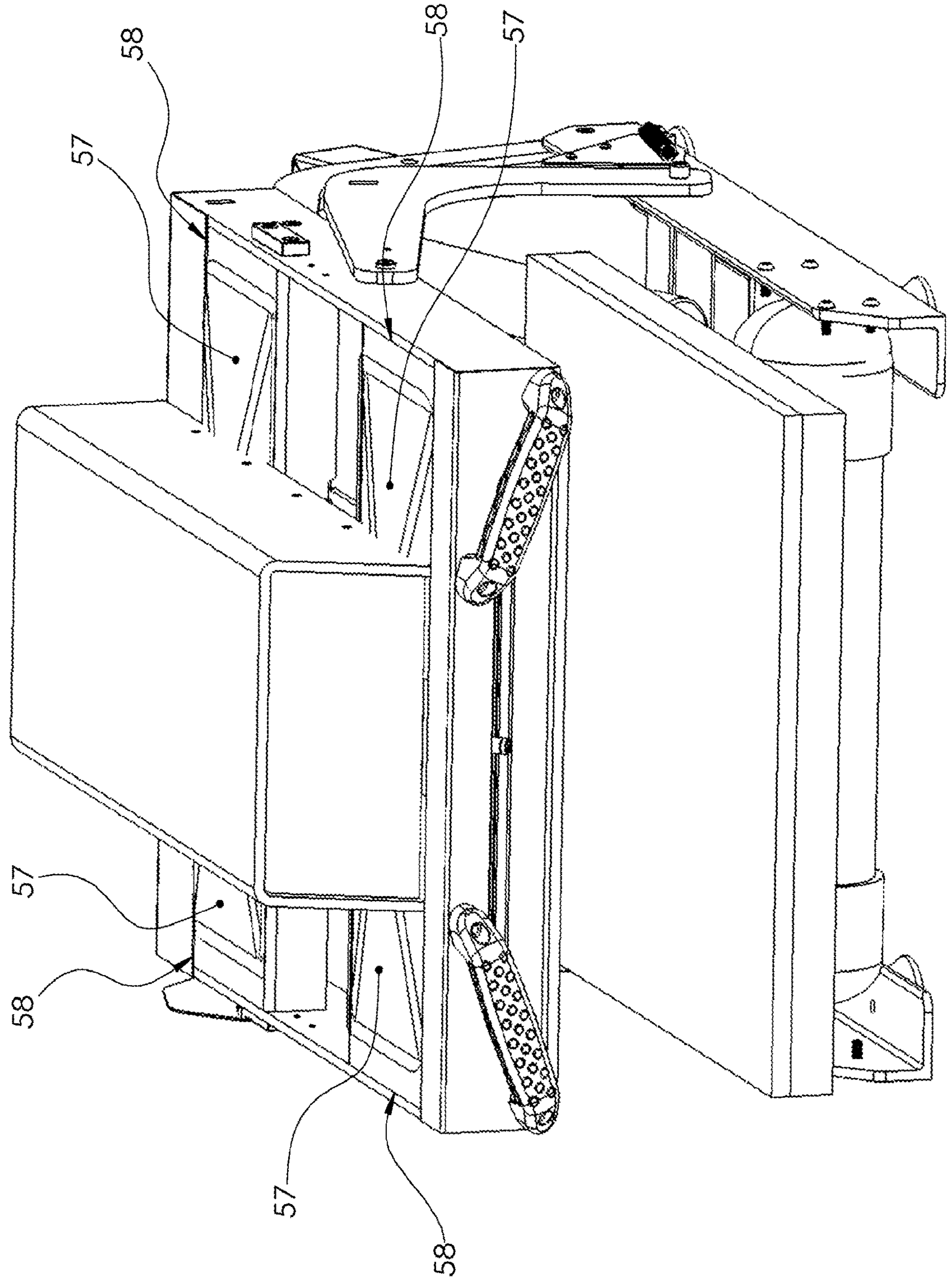
FIG. 10 is a perspective view of another exemplary machine for heat pressing substrates in accordance with the principles of the present disclosure, wherein the machine includes four compressed air bags as force actuators.

Another exemplary embodiment of a machine in accordance with the principles of the present disclosure is depicted in FIG. 10. Similar to the embodiment of FIG. 9, there are four actuators, one on each corner of the heated platen assembly 4. In this embodiment, however, the four force actuators 25 are replaced by compressed air bladders 57. The compressed air bladders 57 are contained between the top of the heated platen 5 and an enclosed framework 58 integral to the upper heated platen assembly 4. When the upper heated platen assembly 4 is in the closed position and the heated platen 5 is in intimate contact with the subject substrate, the machine control system commands solenoid valves within the machine to direct compressed air into the compressed air bladders 57. Since there is a compressed air bladder 57 on each corner the heated platen 5 is pressed vertically downward and onto the substrate.

In the embodiments shown and described herein, the lower platen 3 has been depicted as being generally stationary on the lower platen support frame 2. It will be appreciated that in some embodiments, the lower platen 3 may alternatively be configured to move relative to the lower platen support frame 2 and/or the upper platen assembly 5. As a non-limiting example, the lower platen 3 may be configured for movement in a fore-aft direction relative to the lower platen support frame 2 (i.e., along a longitudinal direction of the lower platen support frame 2), Such motion of the lower platen 3 is typically referred to in industry as a "drawer pull" type motion, which motion can further expose the lower platen 3 for access by an operator. As another non-limiting example, the lower platen may be configured for movement in a vertical direction relative to the lower platen support frame 2. Such vertical motion may be advantageous to facilitate and/or control clamping or pressing a substrate between the upper, heated platen 5 and the lower platen 3, as may be desired.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A heat press for pressing textile substrates, the heat press comprising:
- a frame;
- a lower platen assembly supported on the frame and including a lower platen; and
- an upper platen assembly supported on the frame and including an upper platen;
- wherein the upper platen assembly is supported on the frame for movement in a first mode relative to the lower platen assembly to and between a closed position wherein the upper platen is in registration with the lower platen to clamp the substrate therebetween, and an open position wherein the upper platen is displaced vertically and rearwardly away from the lower platen while maintaining lateral alignment with the lower platen during the rearward displacement;
- wherein the upper and lower platens are supported on the frame such that the upper and lower platens remain horizontal and parallel to one another and laterally aligned in the closed and open positions, and during an entire movement between the closed and open positions.

2. The heat press of claim 1, further comprising at least one actuator operatively coupled with the frame and operable to move the upper platen assembly to and between the open and closed positions.

3. The heat press of claim 1, wherein the lower platen is supported on the frame for at least one of:
- a second movement mode in directions aligned with a fore-aft axis of the press; or
- a third movement mode in directions substantially perpendicular to the fore-aft axis of the press.

4. The heat press of claim 1, further comprising at least one of:
- at least one perimeter sensor configured to detect the presence of an object within a pressing area associated with the upper and lower platens;
- at least one interference sensor configured to detect interference associated with movement of the upper or lower platens before the heat press reaches the closed position;
- at least one parallelism sensor configured to determine a parallel condition between the upper and lower platens, and a control system configured to actuate movement of the heat press responsive to signals from the at least one parallelism sensor; or
- at least one gesture sensor configured to detect a gesture of an operator, and a control system configured to control operation of the heat press in response to signals from the at least one gesture sensor.

5. A heat press for pressing textile substrates, the heat press comprising:
- a frame;
- a lower platen assembly supported on the frame and including a lower platen; and
- an upper platen assembly supported on the frame and including an upper platen;

wherein the upper platen assembly is supported on the frame for movement in a first mode relative to the lower platen assembly to and between a closed position wherein the upper platen is in registration with the lower platen to clamp the substrate therebetween, and an open position wherein the upper platen is displaced vertically and rearwardly away from the lower platen while maintaining lateral alignment with the lower platen during the rearward displacement;

wherein the frame comprises:

a base, a pair of first linkages, each configured as four-bar linkages coupling the base and the upper platen assembly, and a pair of second linkages, each configured as three-bar linkages coupled with the pair of first linkages and the upper platen assembly.

6. The heat press of claim 5, wherein:

The upper platen assembly comprises a pair of guide slots;

the pair of second linkages are engaged with the guide slots for movement therealong; and the guide slots are configured such that upper platen assembly is locked against the B movement when the upper platen and the lower platen engage the substrate in the closed position.

7. The heat press of claim 6, wherein at least one of the upper platen or the lower platen is supported on the respective upper platen assembly or lower platen assembly for movement in a second mode, wherein the movement in the second mode is independent of the first mode and is in a direction such that the upper and lower platens are moved toward one another when the heat press is in the closed position.

8. The heat press of claim 7, wherein the movement in the second mode is linear.

9. The heat press of claim 7, further comprising:

at least one actuator operatively coupled with at least one of the upper or lower platens;

the at least one actuator configured to evenly press the upper platen and the lower platen against one another via the second movement mode.

10. The heat press of claim 9, further comprising:

at least one biasing member operable to bias one of the upper or lower platens in a direction away from the other of the upper or lower platens.

11. The heat press of claim 9, wherein:

the at least one actuator comprises four actuators positioned at symmetric locations proximate peripheral edges of the upper or lower platens; and the four actuators are operable to control forces applied between the upper and lower platens independently of one another.

12. A method of heat pressing a substrate, comprising:

moving an upper platen from a closed position in close proximity to a lower platen, to a fully open position spaced apart from the lower platen while maintaining the upper platen in a horizontal orientation between the closed position and the fully open position of the upper platen;

wherein moving the upper platen to the fully open position comprises moving the upper platen in directions vertically upward and backward relative to the lower platen while maintaining lateral alignment of the upper platen with the lower platen and maintaining the upper and lower platens horizontal and parallel to one another.

13. The method of claim 12, further comprising:

placing a substrate on the lower platen; and moving the upper platen relative to the lower platen from the open position to the closed position;

wherein moving the upper platen relative to the lower platen comprises moving the upper platen in directions vertically downward and forward relative to the lower platen while maintaining lateral alignment of the upper platen with the lower platen.

14. The method of claim 12, further comprising automatically moving the upper platen relative to the lower platen from the open position to the closed position when the heat press is not being used for heat pressing a substrate.

15. The method of any one of claim 12, further comprising:

detecting a presence of an undesired object within a pressing area with at least one sensor; and prohibiting movement of the upper platen relative to the lower platen from the open position to the closed position in response to a detected presence of an undesired object.

16. The method of claim 12, further comprising:

locking the upper platen and the lower platen in the closed position.

17. The method of claim 13, further comprising:

detecting with a sensor a gesture made by an operator and associated with an intended command for operating the heat press; and actuating movement of the upper platen in response to the detected gesture.

* * * * *